United States Patent [19]

Boozer et al.

[11] Patent Number: 4,682,153

[45] Date of Patent: Jul. 21, 1987

[54] FAIL-SAFE SENSOR SYSTEM

[75] Inventors: James M. Boozer, Hampton; Robert W. Mayer; Alan J. Kumasaka, both of Hackettstown; Paul R. Strelecki, Metuchen; Paul F. Lindlau, Long Valley, all of N.J.

[73] Assignee: Amerace Corporation, Hackettstown, N.J.

[21] Appl. No.: 790,445

[22] Filed: Oct. 23, 1985

[51] Int. Cl.[4] .......................... G08B 29/00; G08B 1/00; G08G 1/14

[52] U.S. Cl. ................................ 340/507; 340/309.15; 340/514; 340/552; 340/51; 340/52 H; 340/56; 340/61; 340/903; 180/167

[58] Field of Search ............... 340/507, 506, 903, 958, 340/552-554, 309.15, 51, 52 H, 56, 61, 514; 180/167

[56] References Cited

U.S. PATENT DOCUMENTS

| | | | |
|---|---|---|---|
| 3,383,678 | 5/1968 | Palmer | 340/507 |
| 3,787,838 | 1/1974 | Feintuch et al. | 340/507 |
| 3,979,740 | 9/1976 | Forbat et al. | 340/309.15 |
| 3,982,238 | 9/1976 | Byers | 340/309.15 |
| 4,012,732 | 3/1977 | Herrick | 340/309.15 |
| 4,092,633 | 5/1978 | Fletcher et al. | 340/309.15 |

Primary Examiner—Donnie L. Crosland
Attorney, Agent, or Firm—David Teschner

[57] ABSTRACT

A fail-safe sensor system to provide a positive indication of the proper operation of a sensor system by accounting for the return signals from an active zone and a monitor zone beyond. Search signals, provided by a transducer operating in the transmit mode, are transmitted within an active zone within which objects to be detected are expected to be located. Unreturned search signals are permitted to travel beyond the active zone into a monitor zone beyond and objects in such monitor zone cause return signals which are also employed. A counter feed from a free running clock source is permitted to run up a count whose predetermined limit represents the estimated maximum time period during which a sensor system should operate without contacting an object. Return signals, whether from objects in the active zone or the monitor zone, reset the counter back to zero. The absence of a return signal permits the counter to exceed its predetermined limit and produce an output signal which can be directed to control circuitry, an alarm or logic circuitry to determine if the system is operative.

16 Claims, 3 Drawing Figures

FAIL-SAFE SENSOR SYSTEM

BACKGROUND OF THE INVENTION

1. Field of the Invention

The invention is directed to the field of sensor systems and more particularly to a sensor system that can check its operability and signal appropriately such operability.

2. Description of the Prior Art

In most prior art sensor systems the absence of a signal from the sensor is interpreted as the absence of a return signal and therefore, the absence of an object within the scan area of the sensor system. The sensor system cannot distinguish such object absence from sensor inoperability and permits the incorrect interpretation of the condition. Some sensor testing is performed by passing a separate current through the transducer leads to test for an open circuit condition but cannot test for functioning of the sensor system.

In U.S. Pat. No. 3,932,870 issued Jan. 13, 1976 an FM test signal is transmitted along with the detection signals. The return of this signal to a separate sub-Doppler signal processor can result in an alarm condition being produced. A returned test signal below a predetermined signal level will indicate that the system is not operating properly.

Green, U.S. Pat. No. 3,820,114 issued June 25, 1974 uses a test signal transmitted by the system transmitter to the system's receiver and to a distant receiver. Failure to produce the proper logical signal output shows that the system is not functioning properly.

In U.S. Pat. No. 4,382,291 issued May 3, 1983 to Nakanchi, a pattern of reflected signals is statistically compared with a reference pattern of signals prepared in advance and stored and produces an alarm when these patterns are different. Similarly, in Fullen et al, U.S. Pat. No. 4,197,537, issued Apr. 8, 1980, there is stored a reflective pattern of the area in which the system is operating and the device compares such norm or ambient signal pattern periodically with future signals from the same area. U.S. Pat. No. 4,114,146 to Inow et al. issued Sept. 12, 1978 makes use of a resultant signal from a fixed object such as a wall F and the return signal from a moving object M to produce a resultant signal of a combined phase shift. This can be compared to the phase shift of a signal returned from wall F above. No provision is made for treating a signal from object M above, but such a condition should show an error condition. The same would be true of the patent to Charlot, Jr., U.S. Pat. No. 3,731,307 issued May 1, 1973.

SUMMARY OF THE INVENTION

The present invention overcomes the deficiencies of the prior art by providing a simple method and apparatus for determining the functioning of a sensor system and providing an indication that the sensor system may not be functioning. Further control devices or a human operator may interpret this indication to determine whether the absence of a return signal, in fact, means an object is not present in the scan area or active zone or the sensor system is not functioning. The basis for the instant invention is a counter which can be present to count a number of signals whose total number is equivalent to the maximum time period during which the sensor system should encounter an object in its scan range. If an object is encountered, a return signal is produced which resets the counter. If no object is encountered and the counter exceeds the preset value, an alarm signal is produced which suggests something is wrong because an object should reasonably have been encountered in its scan range during the time period allowed and the absence of such signal suggests that the sensor system is not functioning. Further logical circuitry or a human operator may examine such alarm signal to determine whether or not the sensor system is functioning properly.

Search signals, provided by a transducer operating in the transmit mode, are transmitted within an active zone adjacent the source which may be a moving device where the presence of objects may be a danger to the device upon which the sensor system is mounted or the device may be a danger to such objects. Unreturned search signals are permitted to travel beyond the active zone into a monitor zone beyond to strike and be reflected back by objects in such monitor zone. A counter, whose input terminal is fed from a free-running clock signal source, is permitted to count up towards a predetermined count which is the equivalent of the maximum time period during which the device may be expected to proceed without seeing an object in its path. The counter preset can be changed based upon the expected path or travel of the device.

The counter has an output terminal at which it will issue a signal if it exceeds its predetermined count indicating a return signal was not received during the time period in which such return signal is expected. The counter also has a reset input terminal arranged to receive reset outputs from the transducer operating as a receiver. For any return signal, whether a return signal from an object in the active zone or in the monitor zone, the transducer will produce a reset output signal which will reset the counter back to zero and prevent same from continuing its count and thus prevent the counter from reaching its predetermined count and producing an output. Accordingly, as long as some return signal is received before the counter reaches its predetermined count, the counter will be reset to prevent its reaching such count. The absence of an output from the counter thus confirms the functioning of the sensor system. The failure of the sensor system can be announced by the production of an alarm signal, the changing of the system output signal, whether by type, level or polarity or the operation of a logic system which, for example, may require three consecutive failure cycles before related systems can be shut down. It is, therefore, an object of this invention to provide a fail-safe sensor system.

It is an object of this invention to employ a monitor zone for a sensor system beyond the active zone in which objects are sought.

It is an object of this invention to employ a monitor zone for a sensor system beyond the active zone in which objects are sought and provide an indication of sensor non-function if a return signal is not received from an object in said active zone, in said monitor zone or both.

It is another object of this invention to provide a counter caused to count up by a clock source and resettable by return signals to provide an alarm signal if the counter is permitted to reach a predetermined count.

It is still another object of this invention to provide a counter arranged to produce an output signal upon reaching a predetermined count equal to the maximum amount of time which should elapse before a sensor system receives a return signal from an object in an active zone or a remote monitoring zone beyond.

It is yet another object of this invention to provide a novel fail-safe sensor system by requiring a return signal from an object in a active zone or a monitor zone within a predetermined period.

Other objects and features of the invention will be pointed out in the following description and claims and illustrated in the accompanying drawings, which disclose, by way of example, the principles of the invention, and the best mode which has been contemplated for carrying it out.

BRIEF DESCRIPTION OF THE DRAWING

In the drawings in which similar elements are given similar reference characters.

DESCRIPTION OF THE PREFERRED EMBODIMENT

Figure 1:
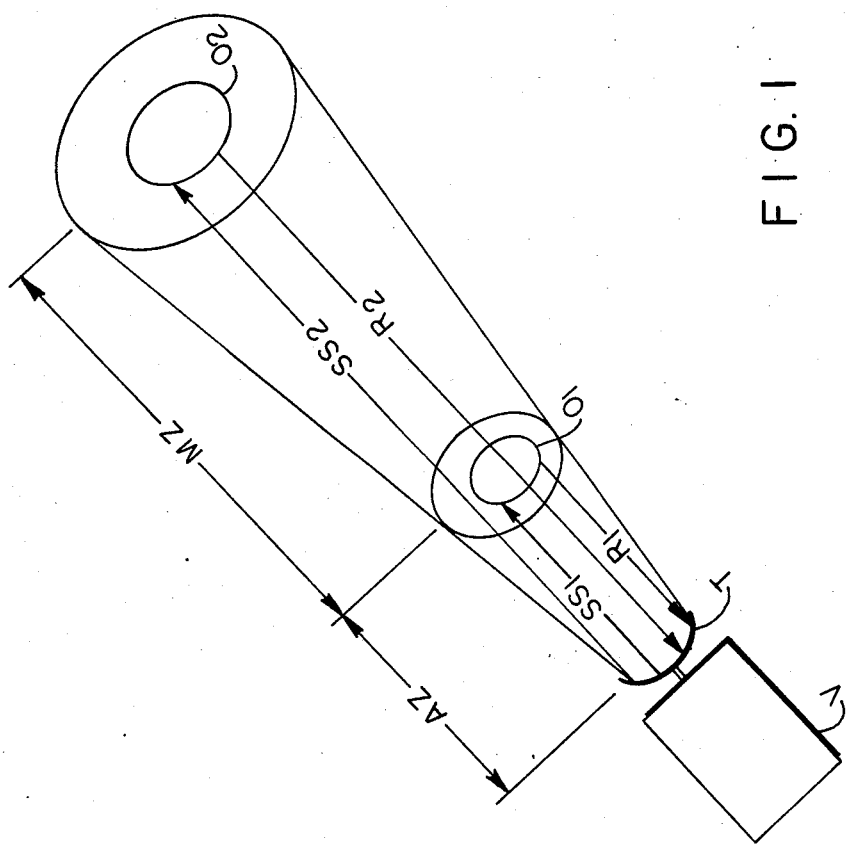
FIG. 1. is diagramatic top plan view of the active and monitor zones preceding a vehicle equipped with the fail-safe sensor system as also described herein.

Turning now to FIG. 1. the underlying framework of the fail-safe sensor system concept is set forth. A self-contained, non-manned vehicle V having mounted thereon a transmitting-receiving transducer T and related system is permitted to move freely within an active zone AZ to carry out its assigned tasks. The antenna, horn or other radiator used for the transducer T is selected to provide a well defined region in front of vehicle V for transmitting and receiving signals. Vehicle V will have direct contact sensors, in the form, perhaps, of bumpers to stop or reverse the direction of travel of vehicle V in the event the vehicle V strikes an object. Although, the description contained herein is in terms of a vehicle, the sensor system could be mounted upon any other type of device or could be stantionary without effecting the operation of the novel fail-safe sensor system disclosed herein. Vehicle V may encounter objects, such as object $O_1$ in its path of travel in active zone AZ, which is the primary sensor search area and will extend approximately 4 to 8 feet in front of the transducer T, using search signals $SS_1$ and stop, reverse or change direction in the event it detects the object $O_1$ by means of return signal $R_1$. The absence of an object $O_1$ in the active zone AZ is quite acceptable and the vehicle V should continue with its work. However, the absence of appropriate control signals $SS_1$ and $R_1$ due to non-functioning of the sensor system is not acceptable and could lead to injury of the object $O_1$, the vehicle V or both. Upon a recognition of the non-functioning of the sensor system, vehicle V should stop or take such action as to avoid the indicated potential injuries. Present sensor systems, as set forth above, do not recognize this condition and do not properly account for it.

Beyond the relatively short active zone AZ is a much longer monitor zone MZ which may extend to fifty feet beyond the transducer T. Signals returned from this monitor zone MZ will not be used to locate objects, but as described below, are used in the fail-safe system. There are no fixed boundaries for the active zone AZ or the the monitor zone MZ, and they merely represent the useful range of the sensor system employed and change with the transducers, antennas, sensors, surroundings etc. of the sensor system and as will be seen below are in no way critical nor need their dimensions be known for the purposes of the instant invention. Also, as in this example, since the sensor system is mounted on a moving vehicle V, the zones move with the vehicle V.

Although search signals $SS_1$ and $SS_2$ are shown as separate signals for the purpose of this discussion they are, in fact, the same signal. Transducer T will send out search signal $SS_1$, in a generally conical pattern in whichever direction it is facing and if such signals strike an object $O_1$, then the search signals $SS_1$ will be reflected as reflected signal $R_1$. In the event there is no object $O_1$ in the path of the search signals $SS_1$ will continue as search-signals $SS_2$ and may ultimately strike an object $O_2$ in the monitor zone MZ causing the creation of return signal $R_2$ or just continue until its energy is dissipated without any return signal.

Figure 2:
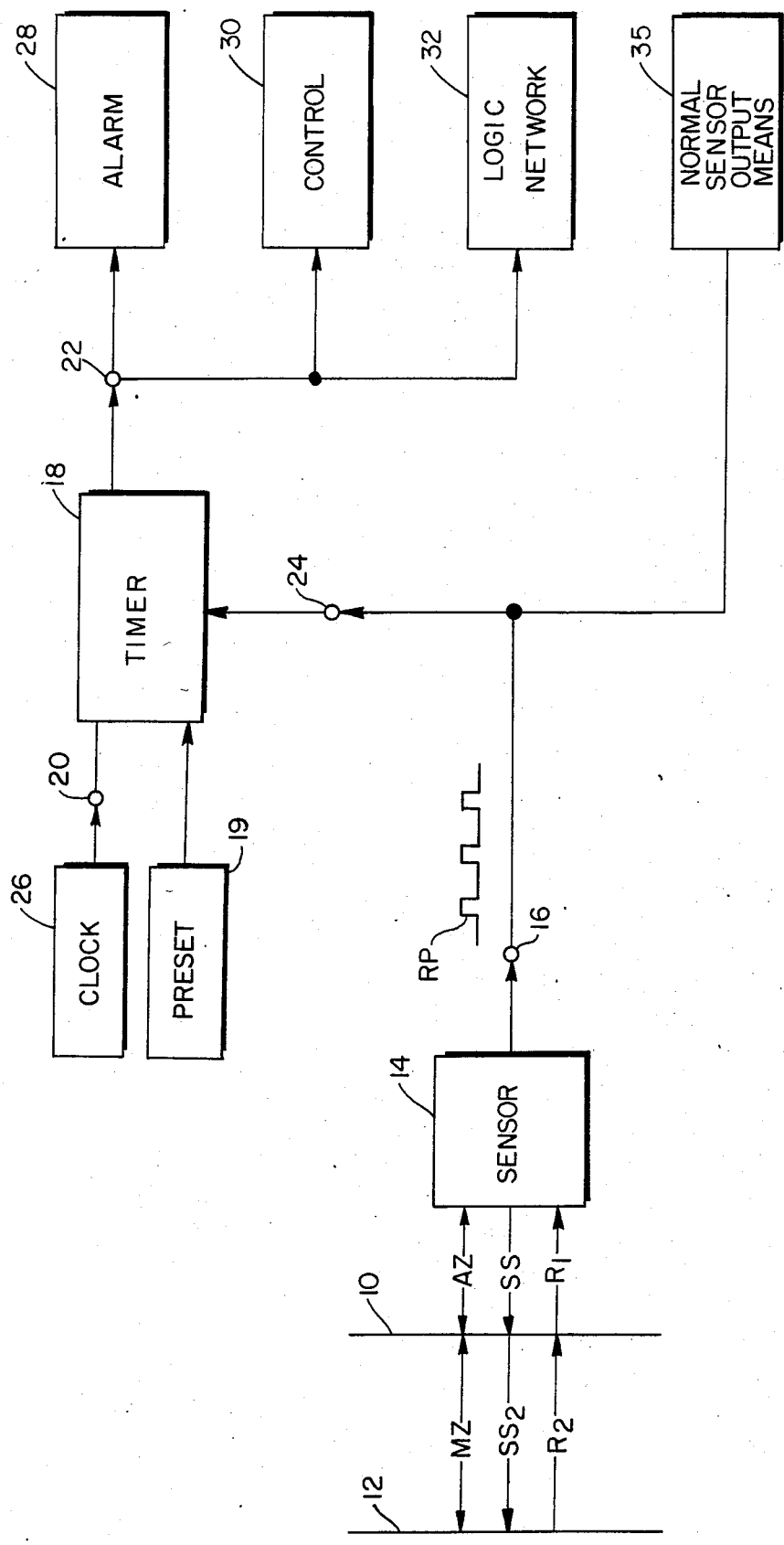
FIG. 2. is a block diagram of a fail-safe sensor system constructed in accordance with the concepts of the invention.

FIG. 2. shows a fail-safe sensor system constructed in accordance with the concepts of the invention. Sensor 14, functioning as a transmitter, emits a burst of energy $SS_1$ which travels outwardly towards the effective boundary 10 of the active zone AZ. The width of the active zone AZ is shown by the reference character AZ with its associated arrows. The burst of energy, if not interferred with or reflected, will continue to the effective boundary 12 of the monitor zone MZ whose width is identified by the reference character MZ with its associated arrows. After the burst of energy $SS_1$ has been emitted, the sensor 14 is switched over to its receiver function as will be described below with reference to FIG. 3. Any reflected or returned signal $R_1$ received by sensor 14 will cause it to produce an output pulse RP at its output terminal 16.

Timer 18 may be of any conventional type such as a chain of flip-flops, gas tube, or the like and is arranged to count to a predetermined number corresponding to the estimated maximum time period during which an object should be encountered. The timer 18 may be selectively preset by a presetting device 19 to a value which reflects the environment in which the sensor system is to be employed. If the environment is busy or cluttered very little time may be expected to pass before an object is encountered and a return signal R is produced and failure to obtain a return signal in such period is a reasonable indication that the sensor system is not functioning. In an environment with little activity longer periods may be permitted to pass without expecting a return signal. Timer 18 has an input terminal 20, an output terminal 22 and a reset terminal 24. A free running clock 26, which may be a crystal oscillator, multivibrator or the like, of any suitable frequency, is coupled to input terminal 20 of timer 18.

When the count in timer 18 exceeds the predetermined count level for which it has been preset by presetting device 19, it produces an output signal on output line 22. This output signal signifies that a return signal $R_1$ has not been received by the sensor 14 within the estimated maximum time period for the receipt of such return signal $R_1$. Since such absence of return signal $R_1$ signals that there is no object in the active zone AZ or the monitor zone MZ it also raises the question of the operability of the sensor system since it is expected that the vehicle V will engage some object within the estimated time period for such contact. The output signal on output line 22 of timer 18 can be coupled to an alarm device 28, which may be visual, audio, or a combination of both, to a control device 30 to stop the vehicle V immediately or coupled to a logic network 32 which may, for example, restart the system and not permit vehicle V shut-down unless three consecutive alarm cycles occur to prevent the unwarranted shutdown of the vehicle V in response to a merely transient condition that will not occur in consecutive cycles. The output of sensor 14 is also fed to the normal sensor output means 35 for routine vehicle V use not described herein.

Assuming, however, that the system is working properly, a reset pulse RP will be produced for each return signal $R_1$, $R_2$ whether from an object $O_1$ or $O_2$. Each of these reset pulses RP will be applied to the reset input terminal 24 of the timer 18. Each reset pulse RP will interrupt the counting cycle of timer 18 and reset the timer 18 to zero and then permit the timer 18 to begin counting anew. With a continuous stream of reset pulses RP the timer 18 is continually reset and never permitted to exceed the predetermined count and issue an alarm signal. The absence of the alarm signal thus indicates that the system is functioning.

Figure 3:
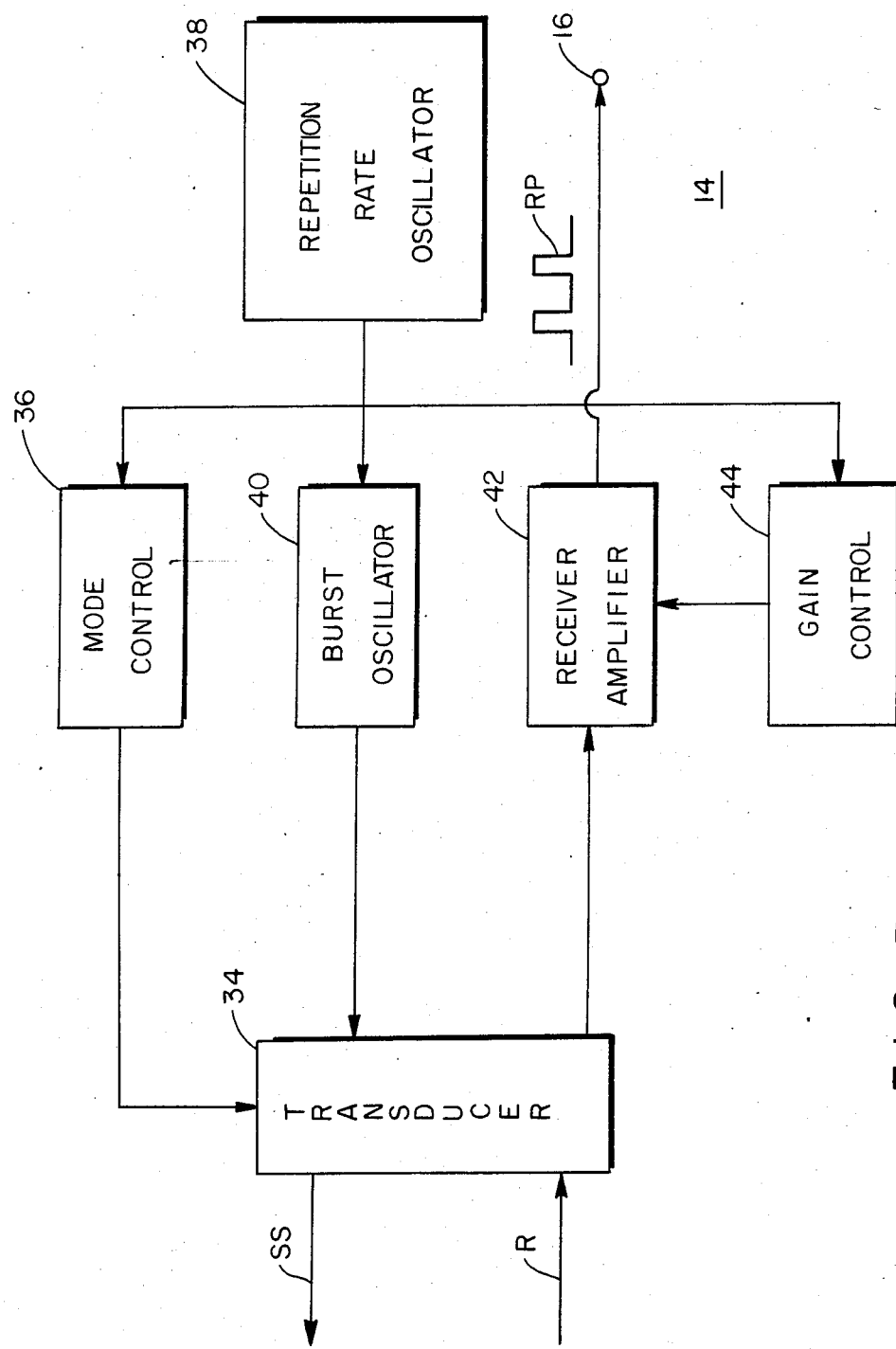
FIG. 3. is an expanded block diagram of the portion of the sensor system of FIG. 2.

The block diagram of FIG. 3. illustrates one way the sensor 14 of FIG. 2. can be realized. A transducer 34, which may be a Polaroid electrostatic transducer model or a piezo-electric crystal model E-188 of Massa Labs., or a source of electromagnetic waves such as a microwave or radar source and detector is arranged to be used alternately in the transmit mode to send a burst of energy out from the device as a search signal SS and then receive the return signal R. Also two separate transducers could be used, one for transmitting and one for receiving. For example there could be electro-optic elements such as a semi-conductor laser source and a silicon avalanche photo diode detector. A mode control 36 alternately operates the transducer 34, to which it is coupled, as a transmitter and a receiver. The cycle time for altering the mode of the transducer 34 is controled by a repetition rate oscillator 38 coupled to the mode control 36. For each signal produced by the repetition rate oscillator 38 the mode control 36 shifts the transducer 34 between its two modes. The repetition rate oscilator is also coupled to the burst oscillator 40 so that every time the mode control 36 places transducer 34 in the transmit mode a burst of energy is generated and applied to transducer 34 for transmission as the search signal SS.

Coupled to the output of transducer 34, when it is operating as a receiver, is a receiver amplifier 42 whose output is the reset pulses RP available at output terminal 16. A gain control device 44 is coupled to receiver amplifer 42 and repetition rate oscillator 38. When transducer 34 is in the transmit mode the repetition rate oscillator 38 operates the gain control 44 so that the gain of the receiver amplifier 42 is kept close to zero. But when the transducer 34 is set to receive the return signals R the gain is set to some base level. The gain of the receiver amplifier 42 is boosted as time elapses from the time the search signal is first transmitted so that the weaker signal returning from the remote portions of the monitor zone MZ is amplified more than the return signal R from an object in the active zone AZ to prevent its loss while not overloading the amplifier 42 with the return signal R from objects in the active zone AZ much closer to the transducer 34.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

The embodiment of the invention in which an exclusive property or privilege is claimed are defined as follows:

1. A fail-safe sensor system comprising: counting means having a selectively settable counting mode for counting input signals received at an input terminal representing an estimated maximum time period during which an object should be encountered within a sensor active zone or a monitor zone beyond and producing an output signal at an output terminal when the number of input signals received exceeds a predetermined number indicating that said sensor system may not be functioning; said counting means further having a reset mode for eliminating the count in said counting means and reinitiating the counting operation upon the receipt of a reset signal at a reset terminal indicating the presence of an object in the signal path active zone or monitor zone portions; transducer means for alternatively transmitting sensing signals traversing in order an active zone in which an object is sought and a monitor zone in which an object may be present and being adapted to receive return signals firstly from objects in said active zone and secondly from objects in said monitor zone; first means coupling said transducer means to said reset terminal of said counting means to apply a reset signal thereat for each return signal received by said transducer; clock means for producing a regular series of signals; second means coupling said clock means to said input terminal of said counting means to provide a series of input signals therefor; control means, and third means coupling said output terminal of said counting means to said control means to operate said control means if the count in said counting means is permitted to exceed said predetermined number between two consecutive reset signals.

2. A sensor system as defined in claim 1, further comprising: mode control means coupled to said transducer means to set said transducer means to transmit sensing signals or adapt said transducer means to receive return signals.

3. A sensor system as defined in claim 1, further comprising a burst oscillator coupled to said transducer means to supply bursts of sensing signals thereto.

4. A sensor system as defined in claim 1, further comprising a burst oscillator coupled to said transducer means to supply bursts of sensing signals thereto and a repetition rate oscillator coupled to said burst oscillator to control the time of occurrence of said bursts of sensing signals produced by said burst oscillator.

5. Sensor system as defined in claim 1, further comprising: a receiver amplifier coupled to said transducer means to amplify any return signals received by said transducer means.

6. A sensor system as defined in claim 1, further comprising: a receiver amplifier coupled to said transducer means to amplify any return signals received by said transducer means; and automatic gain control means coupled to said receiver amplifier to increase the gain of said receiver amplifier the longer the receiver amplifier remains in operation.

7. A sensor system as defined in claim 2, further comprising: a repetition rate oscillator coupled to said mode control means to determine when said mode control means causes said transducer means to transmit sensing signals or adapt said transducer means to receive return signals.

8. A sensing system as defined in claim 6, further comprising: a repetition rate oscillator coupled to said automatic gain control means to control the manner in which said automatic gain control means controls the gain of said receiver amplifier.

9. A sensor system as defined in claim 1, further comprising: alarm means coupled to said output terminal of said counting means for producing an alarm each time said counting means produces an output signal at said output terminal.

10. A sensor system as defined in claim 1, wherein said transducer means is an electrostatic transducer.

11. A sensor system as defined in claim 1, wherein said transducer means is a piezo-electric crystal.

12. A sensor system as defined in claim 1, further including logic means coupled to said output terminal of said counting means to receive said output signals and determine whether the sensor system is operating properly.

13. A sensor system as defined in claim 1, wherein said transducer means comprises separate transducers for transmitting and receiving signals.

14. A sensor system as defined in claim 1, wherein said transducer means is an electromagnetic wave energy source and detector.

15. A sensor system as defined in claim 1, wherein said transducer means are electro-optic elements.

16. A sensor system as defined in claim 15, wherein said electro-optic elements are a laser emitter and a silicon avalanche photo diode detector.

* * * * *